US009075551B2

(12) United States Patent
Kawakami et al.

(10) Patent No.: US 9,075,551 B2
(45) Date of Patent: Jul. 7, 2015

(54) PRINTING DEVICE, PRINTING METHOD, COMPUTER PROGRAM PRODUCT, AND RECORDING MEDIUM

(75) Inventors: Kazuhiro Kawakami, Kanagawa (JP); Yohei Ono, Kanagawa (JP); Yoshinori Fujita, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 968 days.

(21) Appl. No.: 12/898,964

(22) Filed: Oct. 6, 2010

(65) Prior Publication Data

US 2011/0090530 A1    Apr. 21, 2011

(30) Foreign Application Priority Data

Oct. 16, 2009  (JP) ................................. 2009-239766
Oct. 16, 2009  (JP) ................................. 2009-239767
Jul. 16, 2010  (JP) ................................. 2010-162103

(51) Int. Cl.
G06F 3/12      (2006.01)
G06F 21/60     (2013.01)
G06K 15/00     (2006.01)

(52) U.S. Cl.
CPC ............ G06F 3/1238 (2013.01); G06F 3/1222 (2013.01); G06F 21/608 (2013.01)

(58) Field of Classification Search
CPC .................... H04N 2201/3274; H04N 1/2166; G06K 15/1886; G06F 21/78; G06F 3/128; G06F 3/1222; G06F 21/608
USPC ............ 358/1.15, 1.1, 1.4, 1.5, 1.6, 1.9, 1.11, 358/1.12, 1.13, 1.14, 1.16, 1.17, 1.18
See application file for complete search history.

(56) References Cited

U.S. PATENT DOCUMENTS 8,713,648 B2 *  4/2014  Murai et al. ...................... 726/5
2003/0160997 A1 *  8/2003  Kimura .......................... 358/1.15
2007/0019231 A1 *  1/2007  Maeshima .................... 358/1.15
2010/0225946 A1 *  9/2010  Fukasawa ..................... 358/1.13

FOREIGN PATENT DOCUMENTS

JP    2003-274064    9/2003
JP    2009-124346    6/2009
JP    2009-214333    9/2009

OTHER PUBLICATIONS

Product Information: "imagio Personal Authentication Kit Type F2-it/Type F1-it/Type F2/Type F1 IP SiO Personal Authentication kit Type F1." http://www.ricoh.co.jp/imagio/mfp-sol/ic-card/function/function2.html>. Sep. 18, 2009. 4 pages. (with English Translation).

* cited by examiner

*Primary Examiner* — Thierry L Pham

(74) *Attorney, Agent, or Firm* — Oblon, McClelland, Maier & Neustadt, L.L.P.

(57) ABSTRACT

A printing device includes a print data management unit that is capable of storing and managing print data so as to be associated with corresponding identification information used in user identification; an identification information storing unit that stores the identification information; a receiving unit that receives the print data; an identification information obtaining unit that obtains the identification information included in the print data; a registration determining unit that determines whether the obtained identification information is already registered in the identification information stored in the identification information storing unit; an identification information registering unit that registers in the identification information storing unit the obtained identification information when the registration determining unit determines that the obtained identification information is unregistered; and a print data storing unit that stores the received print data in the print data management unit so as to be associated with the obtained identification information.

20 Claims, 12 Drawing Sheets

FIG. 5

| PRIVATE MAILBOX ID | DISPLAY NAME | CODE NUMBER | PRIVATE MAILBOX COLOR | SPOOLING COUNT | LATEST SPOOLING TIME |
|---|---|---|---|---|---|
| ADMIN | ADMINIS-TRATOR | **** | RED | 1 | JULY 22, 2009 10:30 |
| USER1 | USER1 | **** | BLUE | 2 | JULY 22, 2009 13:30 |
| USER2 | USER2 | **** | GREEN | 0 | JULY 21, 2009 15:30 |
| USER3 | USER3 | **** | DEEP BLUE | 1 | JULY 22, 2009 11:30 |

USER INFORMATION TABLE

FIG. 6

```
/spool/admin/100100,20090722103015,10,color,A4,testdoc1
/spool/user1/100101,20090722133025,5,color,A4,testdoc2
/spool/user1/100102,20090721143015,15,color,A4,testdoc3
/spool/user2/100102,20090721153035,5,color,A4,testdoc4
/spool/user3/100103,20090722113020,5,color,A4,testdoc5
```

DIRECTORY | FILE NAME

DIRECTORY STRUCTURE OF SPOOLING AREA

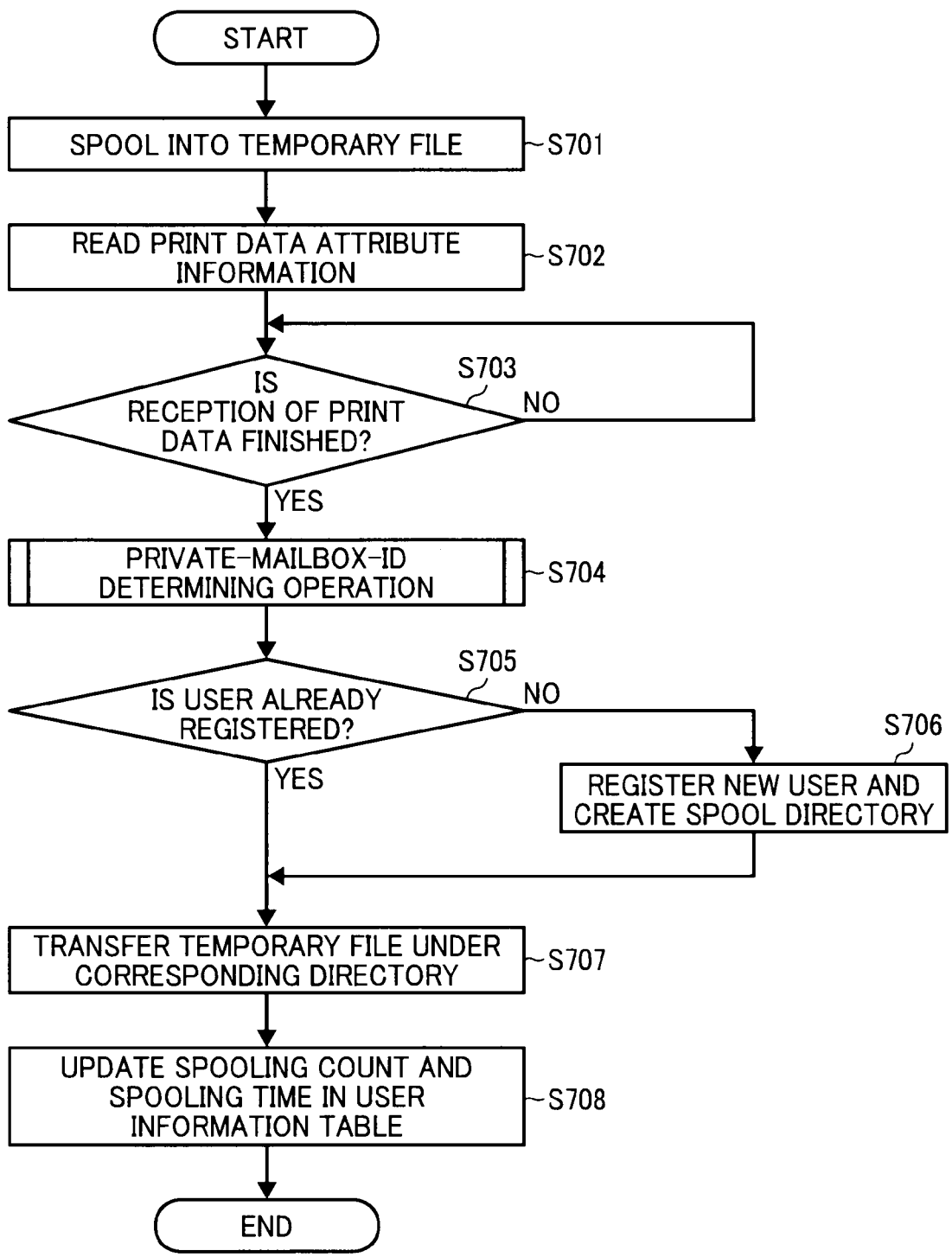

PRIVATE-MAILBOX-ID DETERMINING OPERATION

PRINTING DEVICE, PRINTING METHOD, COMPUTER PROGRAM PRODUCT, AND RECORDING MEDIUM

CROSS-REFERENCE TO RELATED APPLICATIONS

The present application claims priority to and incorporates by reference the entire contents of Japanese Patent Application No. 2009-239766 filed in Japan on Oct. 16, 2009, Japanese Patent Application No. 2009-239767 filed in Japan on Oct. 16, 2009 and Japanese Patent Application No. 2010-162103 filed in Japan on Jul. 16, 2010.

BACKGROUND OF THE INVENTION

1. Field of the Invention

The present invention relates to a printing device, a printing method, a computer program product, and a recording medium.

2. Description of the Related Art

In recent years, large offices are equipped with a plurality of printing devices such as printers that are connected via a network. At the same time, the problem of information leakage attributed to the printed material has been exposed. More specifically, because the printers are instructed to perform printing for a large number of employees, it is now a common occurrence that the confidential information, which is mentioned in the printed material outputted by a certain employee, is caught by another unintended employee.

With regard to that problem, printers are being configured to perform user authentication as a countermeasure against information leakage. In such user authentication, when receiving print data, a printer does not immediately perform printing but temporarily stores (spools) that print data in an embedded hard disk. The user who has sent the print data to the printer then goes to the installation site of the printer in order to perform a login operation and a printing instruction operation. Only after those operations by the user, the print data gets printed by the printer. In the following description, this form of usage is referred to as on-demand printing. Such on-demand printing is a superior printing technology by which it not only becomes possible to prevent information leakage, which is caused by the mix-up of printed material or caused by misplacing the printed material, but also becomes possible to reduce the amount of unnecessary printing or reduce the volume of unattended paper documents.

Herein, a known technique on password authentication can be cited as a leading specific example of user authentication without using an IC card (IC stands for integrated circuit). In order to perform password authentication at a printer, the user needs to input a user ID and a password from the touch-sensitive panel installed on the operation screen of the printer. However, inputting a large number of characters from the touch-sensitive panel is a cumbersome task. Hence, as a technique to reduce the efforts of a user while inputting the user ID, it is possible to display a plurality of user buttons on the touch-sensitive panel and allow each user to select a user button representing the own user. At that time, in order to enable selection of an intended user button from a plurality of user buttons, the user names can be sorted in the Japanese syllabary order or in the alphabetic order so that a user make selection using the initial letters. This way of management is similar to the known technique of address book management.

An example of an information system containing printers is disclosed in Japanese Patent Application Laid-open No. 2003-274064; while an example of on-demand printing is cited in product information/imagio Personal Authentication Kit|Ricoh Japan: [searched on Sep. 18, 2009], Internet <URL: http://www.ricoh.co.jp/imagio/mfp-sol/ic-card/function/function2.html>

In the on-demand technology specified in Non-patent literature 1, IC cards are used for user authentication. However, although such IC cards are superior in terms of allowing user authentication with a minimum key operation and in terms of being easy to use, the introduction of IC cards and card readers is an expensive investment. Besides, it becomes necessary that the user information on all users is registered in advance in the printers. For that, a dedicated system administrator needs to be employed. Hence, typically, the clients implementing the mechanism of user authentication using IC cards have been limited to relatively large-scale companies.

It is well known that on-demand printing is a superior technology for the present-day office environment. However, the mechanism of user authentication make it difficult for the smaller companies or business entities to introduce the on-demand printing technology. Thus, at present, there is required to implement the on-demand printing technology using a simple user authentication mechanism while eliminating the need to use IC cards and the need to employ a dedicated information system administrator.

Besides, in the technique of reducing the efforts of a user while inputting the user ID, it takes a large area on the touch-sensitive panel to display the tabs of all initial letters in the Japanese syllabary order as well as in the alphabetic order. In this case, it becomes necessary to switch between a screen displaying the Japanese syllabary order and a screen displaying the alphabetic order. This leads to increase the efforts for selecting a screen among these screens and make the input task more cumbersome. Moreover, in small companies or business entities, the number of users is commonly not so large that the user management needs to be done in the Japanese syllabary order as well as in the alphabetic order. Thus, the technique of user management using the Japanese syllabary order as well as the alphabetic order is unsuitable when on-demand printing is implemented with only a small number of users in mind.

SUMMARY OF THE INVENTION

It is an object of the present invention to at least partially solve the problems in the conventional technology.

According to an aspect of the present invention, there is provided a printing device that includes: a print data management unit that is capable of storing and managing print data so as to be associated with corresponding identification information used in user identification; an identification information storing unit that stores the identification information; a receiving unit that receives the print data; an identification information obtaining unit that obtains the identification information included in the print data; a registration determining unit that determines whether the identification information obtained by the identification information obtaining unit is already registered in the identification information stored in the identification information storing unit; an identification information registering unit that registers in the identification information storing unit the identification information obtained by the identification information obtaining unit, when the registration determining unit determines that the obtained identification information is unregistered; and a print data storing unit that stores the print data received by the receiving unit in the print data management unit so as to be associated with the identification information obtained by the identification information obtaining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table of an exemplary structure of a user information table illustrated in FIG. 3;

FIG. 6 is an explanatory diagram explaining an exemplary directory structure of a spooling area illustrated in FIG. 3;

FIG. 7 is a flowchart explaining a print data receiving operation;

DETAILED DESCRIPTION OF THE PREFERRED EMBODIMENTS

An exemplary embodiment of a printing device, a printing method, a computer program product, and a recording medium according to the present invention is described in detail below with reference to the accompanying drawings. The present invention is not limited to this exemplary embodiment.

Embodiment

In the present embodiment, the explanation is given with reference to a printer connected to a network. The printer according to the present embodiment is used for on-demand printing by a plurality of client personal computers (PCs). Conventionally, while using a network-compatible printer for on-demand printing, user registration needs to be done in advance. The printer according to the present embodiment provides a mechanism to enable reducing the effort taken for user registration. Besides, typically, at the time of issuing a printing instruction on a printer, it is a cumbersome task to find one's own print data if a large number of users make use of the same printer. The printer according to the present embodiment further provides a mechanism to enable reducing the effort taken for finding one's own print data. Described below are the specific configuration/operations according to the present embodiment.

Figure 1:
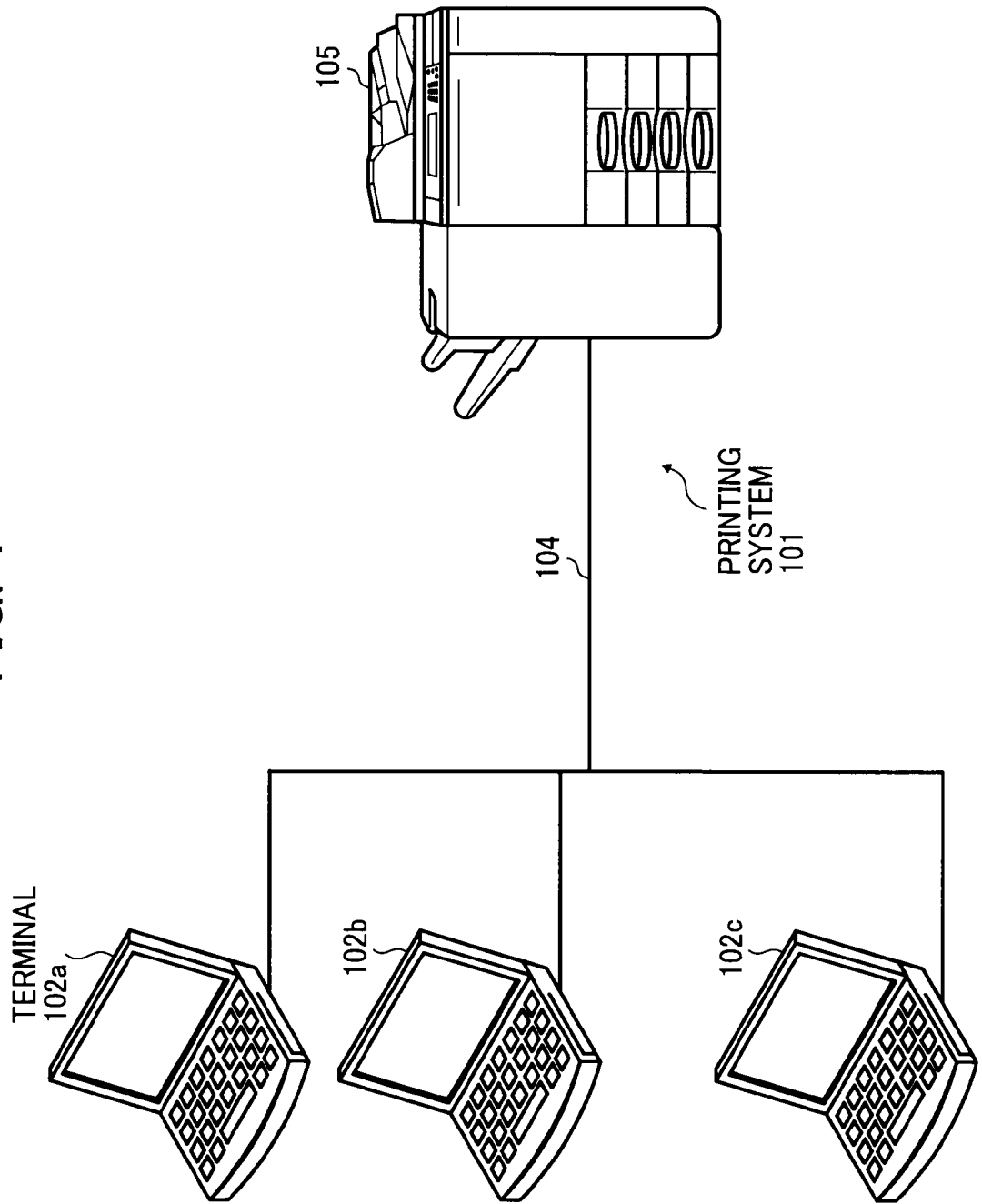
FIG. 1 is an explanatory diagram of an exemplary configuration of a printing system with network connection according to an embodiment of the present invention.

FIG. 1 is an explanatory diagram of an exemplary configuration of a printing system with network connection. A printing system 101 represents a common internal network system, and includes terminals 102a, 102b, and 102c that are the PCs allotted to the employees of that company. In order to print documents, the terminals 102a, 102b, and 102c make use of a multifunction product 105 connected via a network 104. The multifunction product 105 is equipped with the copying function, the facsimileing function, the scanning function, and the printing function. When a user uses the printing function of the multifunction product 105, the user needs to perform user authentication. For that, the user needs to go to the installation site of the multifunction product 105, and select the print job instructed by the own user and input a password as necessary.

Figure 2:
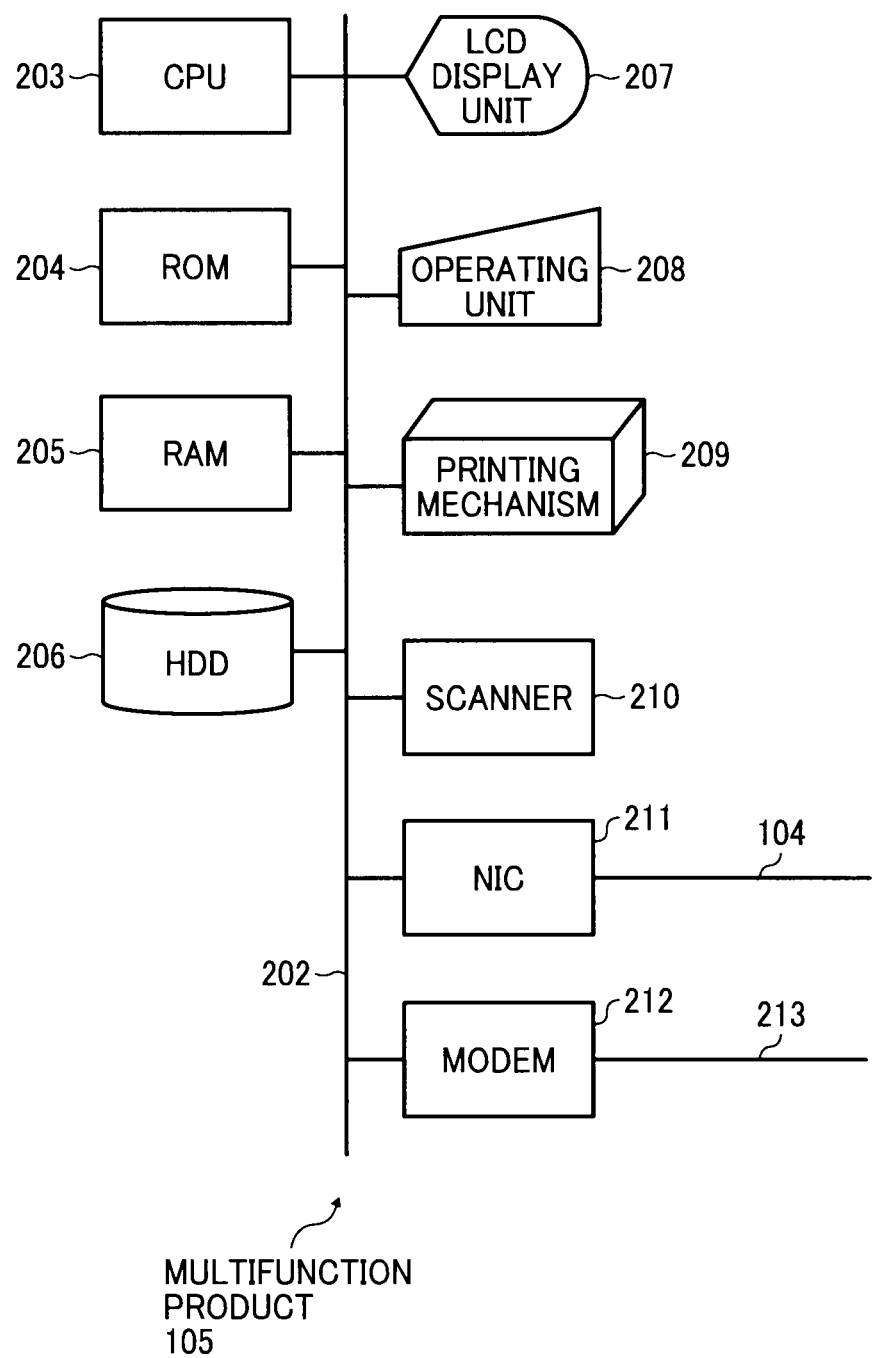
FIG. 2 is a block diagram of an exemplary hardware configuration of a multifunction product illustrated in FIG. 1.

FIG. 2 is a block diagram of an exemplary hardware configuration of the multifunction product 105. From the perspective of an information processing apparatus, the multifunction product 105 is essentially equivalent to a computer. In the multifunction product 105, a bus 202 interconnects a central processing unit (CPU) 203, a read only memory (ROM) 204, a random access memory (RAM) 205, a hard disk drive (HDD) 206 functioning as a nonvolatile storage unit, an LCD display unit 207 and an operating unit 208 forming a liquid crystal touch-sensitive panel, a printing mechanism 209 for providing the printing function, a scanner 210 for providing the scanning function and the facsimileing function, a network interface card (NIC) 211 for receiving print data, and a modem 212 for facsimile communication. In the present embodiment, since the scanner 210 and the modem 212 are implemented with the commonly known technology and are not directly relevant in the following description, the detailed explanation thereof is not given.

The print data sent from a terminal passes through the network 104 and the NIC 211, and is stored in the HDD 206. Subsequently, the user operates the operating unit 208 for checking the details displayed on the LCD display unit 207, selecting the print job instructed by self, and issuing a printing instruction. Only after those operations by the user, the print data stored in the HDD 206 is supplied to the printing mechanism 209 for printing.

Figure 3:
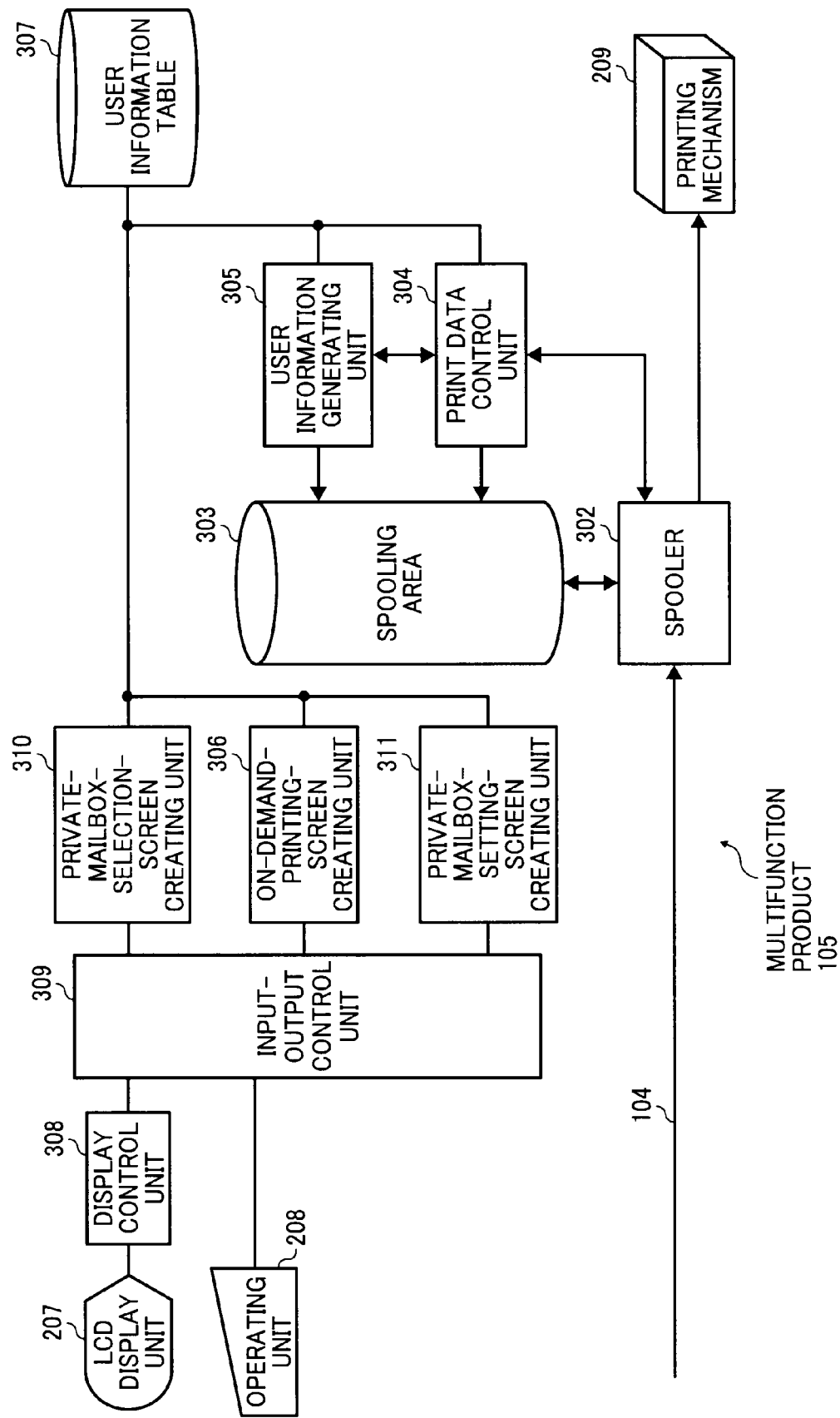
FIG. 3 is a block diagram of exemplary functions of the software implemented in the multifunction product illustrated in FIG. 1.

FIG. 3 is a block diagram of exemplary functions of the software implemented in the multifunction product 105. The HDD 206 of the multifunction product 105 is used to store computer program that are executed for implementing a network operating system (OS) and various functions such as the printing function and a user authentication function. The functions implemented by the execution of the computer programs are illustrated in FIG. 3.

The print data sent from a terminal first reaches a spooler 302 via the network 104. The spooler 302 stores the print data in a spooling area 303 inside the HDD 206. Besides, according to an instruction from a print data control unit 304 (described later), the spooler 302 sends the print data stored (held) in the spooling area 303 to the printing mechanism 209.

The spooling area 303 is kept under a specified directory inside the HDD 206. In the present embodiment, since the network OS running in the multifunction product 105 confirms to POSIX (POSIX stands for portable operating system interface for UNIX (registered trademark)), the spooling area 303 is represented as "/spool/" or can be represented as "/var/spool/".

The print data control unit 304 implements various functions. One of the functions is to read header information of each set of print data received by the spooler 302 and then send the header information as print data attribute information to a user information generating unit 305 (described later). Another function is to transfer a set of print data that has been completely received by the spooler 302 under the directory of the corresponding user in the spooling area 303 and then rename the file name of that set of print data. Still another function is to enable printing of a predetermined set of print data, which is stored in the spooling area 303, according to an instruction from an on-demand-printing-screen creating unit 306 (described later) by instructing the spooler 302 to output that set of print data to the printing mechanism 209. Still another function is to delete a predetermined set of print data stored (held) in the spooling area 303 according to an instruction from the on-demand-printing-screen creating unit 306.

The user information generating unit 305 receives print data attribute information from the print data control unit 304 and determines, while referring to a user information table 307 (described later), whether the user information included in that print data points to a new user. If the user information determined to point to a new user, then the user information generating unit 305 adds a new record in the user information table 307, and creates a subdirectory for that new user in the spooling area 303.

As the abovementioned description, the spooler 302, the print data control unit 304, and the user information generating unit 305 are the functional blocks that operate upon the reception of a set of print data.

Herein, with reference to FIG. 3, the spooling area 303 functions as a print data storing unit; the spooler 302 functions as a receiving unit; the user information generating unit 305 functions as an identification information obtaining unit, a registration determining unit, and an identification information registering unit; and the print data control unit 304 functions as a print data saving unit.

The LCD display unit 207 is a known color LCD, which is needed to be a display element capable of multicolor display for displaying color tabs and color marks described later with reference to FIG. 11. The operating unit 208 includes a known touch-sensitive panel superposed on the LCD display unit 207 and made of a resistance film, and various operation buttons. A display control unit 308 controls the display on the LCD display unit 207 on the basis of display data sent by an input-output control unit 309 (described below).

The input-output control unit 309 connects the display control unit 308 to the operating unit 208 by selecting one of a private-mailbox-selection-screen creating unit 310 (described later), the on-demand-printing-screen creating unit 306 (described later), and a private-mailbox-setting-screen creating unit 311 (described later). Then, the input-output control unit 309 performs an operation of receiving display data from selected one of the private-mailbox-selection-screen creating unit 310, the on-demand-printing-screen creating unit 306, and the private-mailbox-setting-screen creating unit 311, and of transferring the display data to the display control unit 308. Furthermore, the input-output control unit 309 performs an operation of receiving operation information from the operating unit 208 and sending that operation information to selected one of the private-mailbox-selection-screen creating unit 310, the on-demand-printing-screen creating unit 306, and the private-mailbox-setting-screen creating unit 311. Besides, according to the operation information input by the user on the operating unit 208, the input-output control unit 309 changes the selection among the private-mailbox-selection-screen creating unit 310, the on-demand-printing-screen creating unit 306, and the private-mailbox-setting-screen creating unit 311.

The private-mailbox-selection-screen creating unit 310 displays a private mailbox selection screen (described later) on the LCD display unit 207. In order to implement that function, the private-mailbox-selection-screen creating unit 310 receives the operation information from the operating unit 208, reads the user information table 307 (described later), and creates display data to be displayed on the LCD display unit 207.

The on-demand-printing-screen creating unit 306 displays an on-demand printing screen (described later) on the LCD display unit 207. In order to implement that function, the on-demand-printing-screen creating unit 306 receives the operation information from the operating unit 208, reads the user information table 307, communicates necessary information with the print data control unit 304 (described later), and creates display data to be displayed on the LCD display unit 207.

The private-mailbox-setting-screen creating unit 311 displays a private mailbox setting screen on the LCD display unit 207. In order to implement that function, the private-mailbox-setting-screen creating unit 311 receives the operation information from the operating unit 208, reads the user information table 307, and creates display data to be displayed on the LCD display unit 207.

As abovementioned, the display control unit 308, the input-output control unit 309, the private-mailbox-selection-screen creating unit 310, the on-demand-printing-screen creating unit 306, and the private-mailbox-setting-screen creating unit 311 are the functional blocks that operate in a response to user operation.

Figure 4:
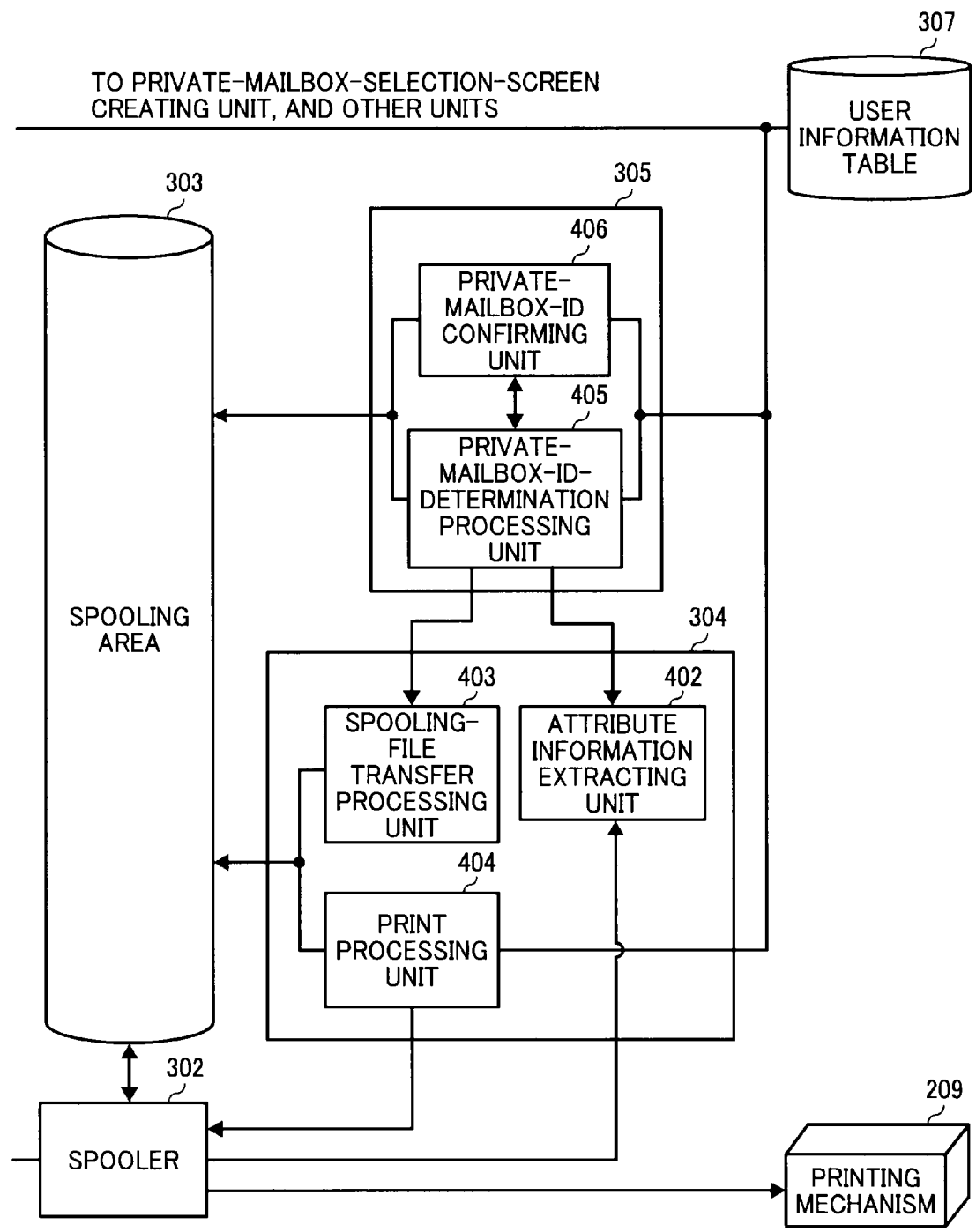
FIG. 4 is a block diagram explaining details of a print data control unit and a user information generating unit illustrated in FIG. 3.

FIG. 4 is a block diagram explaining the details of the print data control unit 304 and the user information generating unit 305. Herein, the print data control unit 304 and the user information generating unit 305 illustrated in FIG. 3 are focused on and the internal configurations thereof are illustrated in FIG. 4.

The print data control unit 304 includes three functional blocks, namely, an attribute information extracting unit 402, a spooling-file transfer processing unit 403, and a print processing unit 404.

The attribute information extracting unit 402 receives the header information of a set of print data from the spooler 302 and sends the header information as print data attribute information to a private-mailbox-ID-determination processing unit 405 (described later) of the user information generating unit 305. The spooling-file transfer processing unit 403 receives a private mailbox ID from the private-mailbox-ID-determination processing unit 405 of the user information generating unit 305, transfers the set of print data, which has been completely received by the spooler 302, under the directory of the corresponding user (private mailbox ID) in the spooling area 303, and then renames the file name of that set of print data.

The print processing unit 404 enables printing of a predetermined set of print data in the spooling area 303 according to an instruction from the on-demand-printing-screen creating unit 306 by instructing the spooler 302 to output that set of print data to the printing mechanism 209. Besides, the print processing unit 404 deletes a predetermined set of print data from the spooling area 303 according to an instruction from the on-demand-printing-screen creating unit 306.

The user information generating unit 305 includes two functional blocks, namely, the private-mailbox-ID-determination processing unit 405 and a private-mailbox-ID confirming unit 406.

The private-mailbox-ID-determination processing unit 405 receives a set of print data attribute information from the attribute information extracting unit 402 and determines the private mailbox ID of the corresponding set of print data received by the spooler 302. Then, the private-mailbox-IDdetermination processing unit 405 transfers the private mailbox ID to the private-mailbox-ID confirming unit 406, and instructs the private-mailbox-ID confirming unit 406 to confirm whether that private mailbox ID is already registered in the user information table 307. When the private-mailbox-ID confirming unit 406 finishes confirmation regarding the private mailbox ID, the private-mailbox-ID-determination processing unit 405 updates the spooling count and the spooling time of a corresponding record in the user information table 307.

The private-mailbox-ID confirming unit 406 receives the private mailbox ID determined by the private-mailbox-ID-determination processing unit 405 therefrom, searches the user information table 307 for that private mailbox ID, and confirms whether that private mailbox ID is already registered in the user information table 307. If the private mailbox ID belongs to a new user, then the private-mailbox-ID confirming unit 406 creates a directory for that private mailbox ID in the spooling area 303.

FIG. 5 is a table of an exemplary structure of the user information table 307. With reference to FIG. 5, the "private mailbox ID" field represents the information included in the headers of the sets of print data and is used in uniquely identifying the respective users of the multifunction product 105. Thus, the "private mailbox ID" field can also be referred to as the "user ID" field. The "display name" field represents the title that each user wishes to display in place of the private mailbox ID on the LCD display unit 207 of the multifunction product 105. The users can arbitrarily set such titles from the private-mailbox-setting-screen creating unit 311. In the "code number" field are stored the code numbers that the users set arbitrarily from the private-mailbox-setting-screen creating unit 311. In the "private mailbox color" field are stored the colors of the private mailboxes that the users set arbitrarily from the private-mailbox-setting-screen creating unit 311. In the "spooling count" field are stored the number of sets of print data present in the spool directory of each user. In the "latest spooling time" field is stored the date and time of creation of the latest set of print data from among the sets of print data, which is present in the spool directory of each user.

The "latest spooling time" field is used as a key field at the time of sort operation during a private-mailbox-selection-screen displaying operation described later with reference to FIG. 9. As a result, while displaying the private mailbox selection screen, the latest sets of print data are displayed as the leading set.

Besides, the "latest spooling time" field is also used as an index for deleting the records of users who hardly operate the multifunction product 105. For example, consider a case when the records are maintained with respect to those users who have not operated the multifunction product 105 for more than a month. In that case, the user information table 307 keeps growing each time the personnel transfers are carried out. Consequently, the speed at which the user information table 307 can be referred to goes on decreasing. Thus, for example, with 30 days as a rough indication, periodic deletion of the records of those users who hardly operate the multifunction product 105 can eliminate the need for spending time and efforts in performing user management. Meanwhile, at the time of deleting such users, the respective spool directories in the spooling area 303 are also deleted.

The abovementioned user deletion operation can be performed on a periodic basis, such as about once a day, by using a known scheduler such as "cron" used in a POSIX-type OS. Although not illustrated in FIGS. 3 and 4, a user deleting unit is disposed that obtains the information regarding the current date and time from a known calendar clock, confirms the details of the "latest spooling time" field in the user information table 307, and accordingly performs the user deletion operation.

FIG. 6 is an explanatory diagram explaining an exemplary directory structure of the spooling area 303. Under the directory "/spool/" for the spooling area 303, subdirectories are created with titles identical to the respective private mailbox IDs. The file names are specified in text with commas (,) as the field separators. Each file name includes the fields "job number", "spooling time", "page count", "color printing or black-and-white printing", "paper size", and "document name" in that order starting from the left side. In this way, each file represents the specification of the corresponding set of print data. Thus, just by reading the file name of a print data file that is present in the directory of a particular user, the detailed information regarding the corresponding set of print data can be obtained.

FIG. 7 is a flowchart explaining a print data receiving operation. More specifically, the flowchart represents the sequence of operations performed by the spooler 302, the print data control unit 304, and the user information generating unit 305 when the spooler 302 receives a set of print data.

Upon receiving a set of print data from a terminal, the spooler 302 automatically creates a unique file name and puts the set of print data into that file (Step S701). At the same time, the spooler 302 transfers the received set of print data to the print data control unit 304, in which the attribute information extracting unit 402 reads print data attribute information from the header of the set of print data (Step S702).

Subsequently, the print data control unit 304 determines whether reception of the set of print data is finished (Step S703). If reception of the set of print data is not yet finished (No at Step S703), then the print data control unit 304 waits until the spooler 302 finishes receiving that set of print data. When the spooler 302 finishes receiving the set of print data and successfully closes the print data file (Yes at Step S703), the attribute information extracting unit 402 of the print data control unit 304 transfers the print data attribute information to the user information generating unit 305. Upon receiving the print data attribute information, the private-mailbox-ID-determination processing unit 405 of the user information generating unit 305 performs a private-mailbox-ID determining operation (described later) (Step S704), obtains the private mailbox ID of the set of print data received by the spooler 302, and transfers the private mailbox ID to the private-mailbox-ID confirming unit 406 of the user information generating unit 305.

Subsequently, the private-mailbox-ID confirming unit 406 verifies that private mailbox ID against the user information table 307 and determines whether the private mailbox ID is already registered in the user information table 307 (Step S305). If the private mailbox ID is not yet registered (No at Step S305), the private-mailbox-ID confirming unit 406 adds a new record for that private mailbox ID in the user information table 307 and creates a spool directory for that private mailbox ID in the spooling area 303 (Step S706).

On the other hand, if the private mailbox ID is already registered in the user information table 307 (Yes at Step S705) or if the operation at Step S706 is already performed, then the private mailbox ID of the received set of print data is considered to be determined. In that case, the private-mailbox-ID-determination processing unit 405 of the user information generating unit 305 transfers that private mailbox ID to the print data control unit 304. In the print data control unit 304; the spooling-file transfer processing unit 403 receives the private mailbox ID, transfers the set of print data that is temporarily stored during Step S703 under the directory of the received private mailbox ID, and then renames the file name based on the print data attribute information obtained at Step S702 (Step S707).

Lastly, the private-mailbox-ID-determination processing unit 405 of the user information generating unit 305 updates the record of that private mailbox ID in the user information table 307. More specifically, the private-mailbox-ID-determination processing unit 405 checks the number of print data files present in the directory of that private mailbox ID, updates the "spooling count" field of that private mailbox ID, and updates the corresponding "latest spooling time" field based on the spooling time appended to the file name of the latest print data file created at Step S707 (Step S708). This marks the end of the print data receiving operation.

At the time of registering a new user at Step S706, the private-mailbox-ID-determination processing unit 405 sets the private mailbox color to "deep blue" as the specified value in the initial state (i.e., as the default value). The user can change the value of the private mailbox color from the private mailbox setting screen described later with reference to FIG. 10.

As described above, when the multifunction product 105 receives a set of print data, the user information generating unit 305 determines whether that set of print data belongs to an existing user. If the set of print data is determined to belong to a new user, the user information generating unit 305 immediately registers that user in the user information table 307, creates a spool directory for the new user, and transfers the print data file of the received set of print data in the newly-created spool directory.

Figure 8:
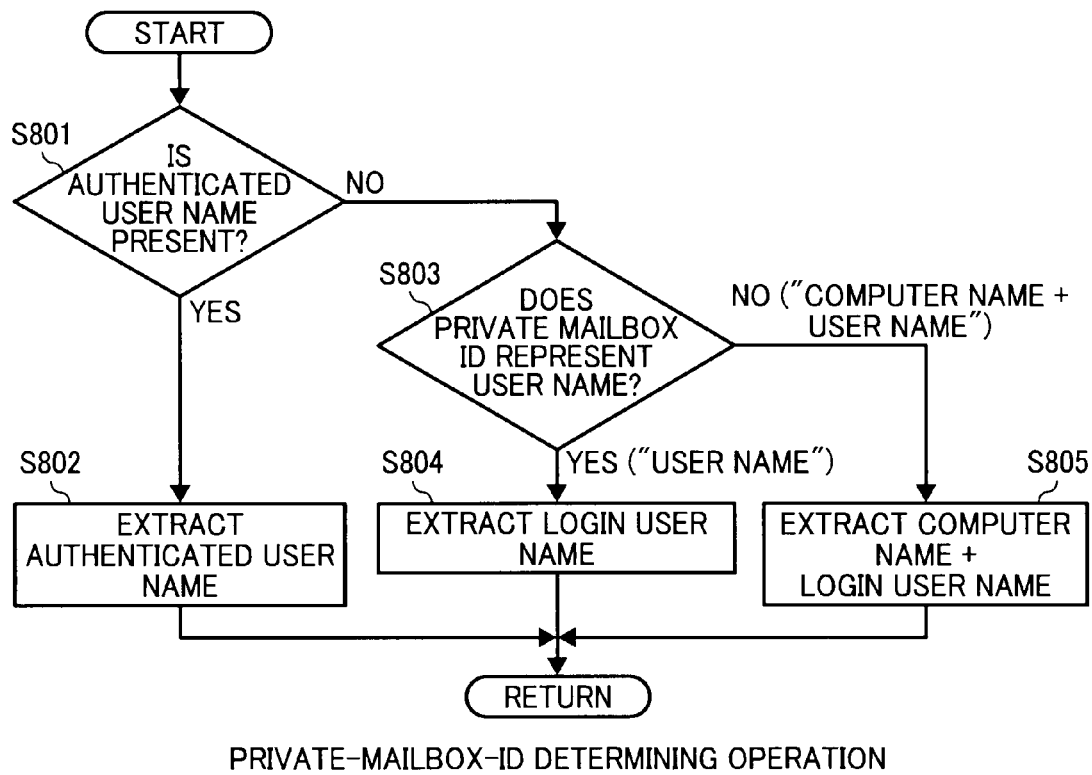
FIG. 8 is a flowchart explaining details of a private-mailbox-ID determining operation.

FIG. 8 is a flowchart explaining the details of the private-mailbox-ID determining operation performed at Step S704. To start with that operation, the private-mailbox-ID-determination processing unit 405 of the user information generating unit 305 determines whether an authenticated user name is present in the print data attribute information, which is received from the attribute information extracting unit 402 of the print data control unit 304 (Step S801). Herein, the authenticated user name is an arbitrary user name that is set from a setting screen of the print driver installed in the corresponding terminal. If the authenticated user name is present (Yes at Step S801), then the private-mailbox-ID-determination processing unit 405 extracts the authenticated user name, transfers it to the private-mailbox-ID confirming unit 406 (Step S802), and ends the operation.

On the other hand, if the authenticated user name is absent (No at Step S801), then the private-mailbox-ID-determination processing unit 405 confirms the format of the private mailbox ID set in advance at the time of installing the multifunction product 105 (Step S803). If the private mailbox ID is in the format of "user name" (Yes at Step S803), then the private-mailbox-ID-determination processing unit 405 extracts the login user name from the print data attribute information and transfers it to the private-mailbox-ID confirming unit 406 (Step S804), and ends the operation. Herein, the "user name" is the login ID used for user authentication at the time of operating the OS such as Windows (registered trademark) running in the terminal. At the time of generating a set of print data, the print driver installed in that terminal puts the login ID as the user name in the header of the set of print data.

On the other hand, if the private mailbox ID is in the format of "computer name+user name" (No at Step S803), then the private-mailbox-ID-determination processing unit 405 extracts the computer name and the login user name from the print data attribute information, and transfers these names in a combinational format to the private-mailbox-ID confirming unit 406 (Step S805), and ends the operation.

Herein, the "computer name" is the arbitrary machine name given by the installation operator at the time of installing the OS to be run in the terminal. At the time of generating a set of print data, the print driver installed in that terminal puts the machine name as the computer name in the header of the set of print data.

As described above, the user information generating unit 305 first reads the print data attribute information included in the header of a set of print data, and confirms whether an authenticated user name is present. If an authenticated user name is present, then the user information generating unit 305 obtains, on a priority basis, the authenticated user name as the private mailbox ID for uniquely identifying the user. On the other hand, if an authenticated user name is absent, then the user information generating unit 305 confirms whether the private mailbox ID is specified in the format of "user name" or in the format of "computer name+user name". If the private mailbox ID is specified in the format of "user name", then the user information generating unit 305 obtains the user name from as the private mailbox ID from the print data attribute information. If the private mailbox ID is specified in the format of "computer name+user name", then the user information generating unit 305 obtains the computer name and the user name from the print data attribute information and combines those names as the private mailbox ID.

Thus, as soon as a set of print data is received from a user, the private mailbox ID is read from the header of that set of print data for the purpose of uniquely identifying that user.

The format of the private mailbox ID depends on the manner in which the corresponding terminal present on the network 104 is being managed. In the case of Windows (registered trademark), there are two types of management, namely, "domain management" and "workgroup management".

In the case of "domain management", a domain management server is present on the network 104 for ensuring the uniqueness of user names. That makes it possible to identify users just by referring to the user names.

In the case of "workgroup management", the uniqueness of user names cannot be guaranteed. Hence, in order to ensure uniqueness, computer names are also taken into consideration along with the user names.

Figure 9:
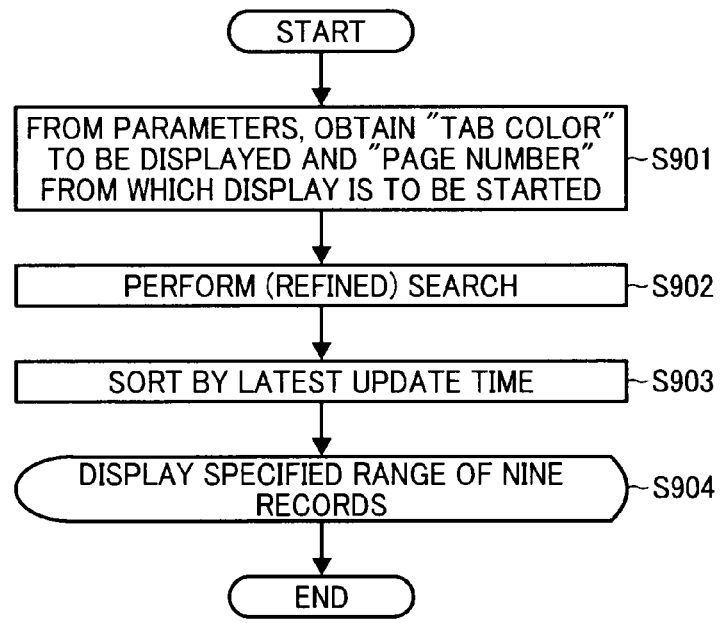
FIG. 9 is a flowchart explaining a private-mailbox-selection-screen displaying operation.

FIG. 9 is a flowchart explaining the private-mailbox-selection-screen displaying operation. More specifically, the flowchart represents the sequence of operations performed by the private-mailbox-selection-screen creating unit 310, the input-output control unit 309, the display control unit 308, and the LCD display unit 207 in response to an operation of the operating unit 208 by a user.

To start with, from the parameters received at the time of booting, the private-mailbox-selection-screen creating unit 310 obtains information regarding the "tab color" to be displayed and the "page number" from which the display is to be started (Step S901). Based on the "tab color" obtained at Step S901, the private-mailbox-selection-screen creating unit 310 carries out a refined search on the user information table 307 (Step S902). More specifically, the search is narrowed down to the records having the value in the "spooling count" field equal to or larger than one.

Subsequently, with respect to the searched records in the user information table 307, the private-mailbox-selection-screen creating unit 310 performs a descending sort on the basis of the values in the "latest spooling time" field in the user information table 307 (Step S903). Lastly, based on the information regarding the "page number", the private-mailbox-selection-screen creating unit 310 sends information regarding a specified range of nine records to the display control unit 308 via the input-output control unit 309. Then, the display control unit 308 controls the LCD display unit 207 and displays the information on the nine records (Step S904). This marks the end of the private-mailbox-selection-screen displaying operation.

Figure 10:
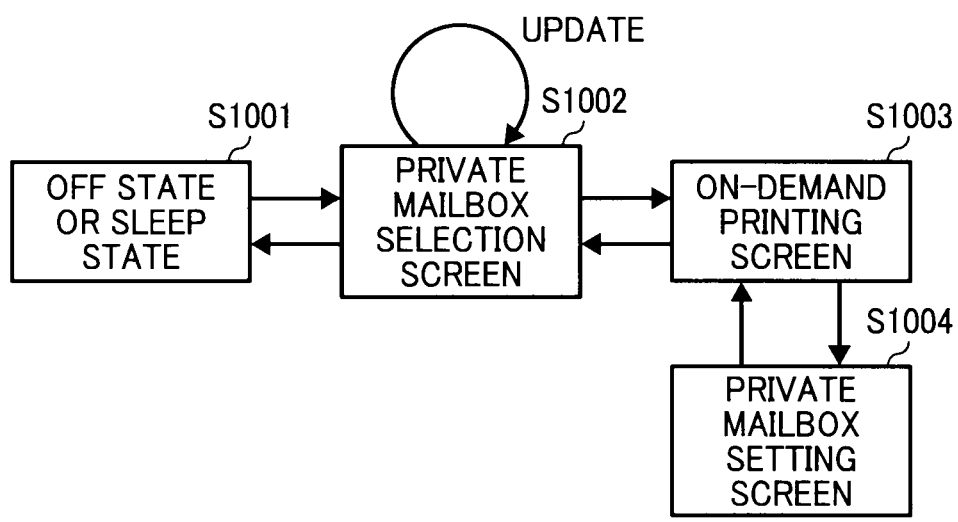
FIG. 10 is a state transition diagram explaining the display states of a liquid crystal display (LCD) display unit illustrated in FIG. 2.

FIG. 10 is a state transition diagram explaining the display states of the LCD display unit 207. In the power OFF state or in the sleep state (State S1001), no information is displayed on the LCD display unit 207. When the state changes from State S1001 to the power ON state or when the sleep state is over, the private mailbox selection screen is displayed (State S1002). By pressing an update button (described later) or a color selection button (described later) on the private mailbox selection screen, only the display contents change in the private mailbox selection screen.

When a specific private mailbox is selected at State S1002 and when a predetermined login sequence is followed, the on-demand printing screen is displayed (State S1003). In the on-demand printing screen displayed on the LCD display unit 207, a list of the sets of print data is displayed such that it can be individually specified whether to print a particular set of print data or to delete without printing. When a certain button is pressed at State S1003, the private mailbox setting screen is displayed (State S1004). In the private mailbox setting screen, the user can set the display name, the password, and the display color.

Figure 11:
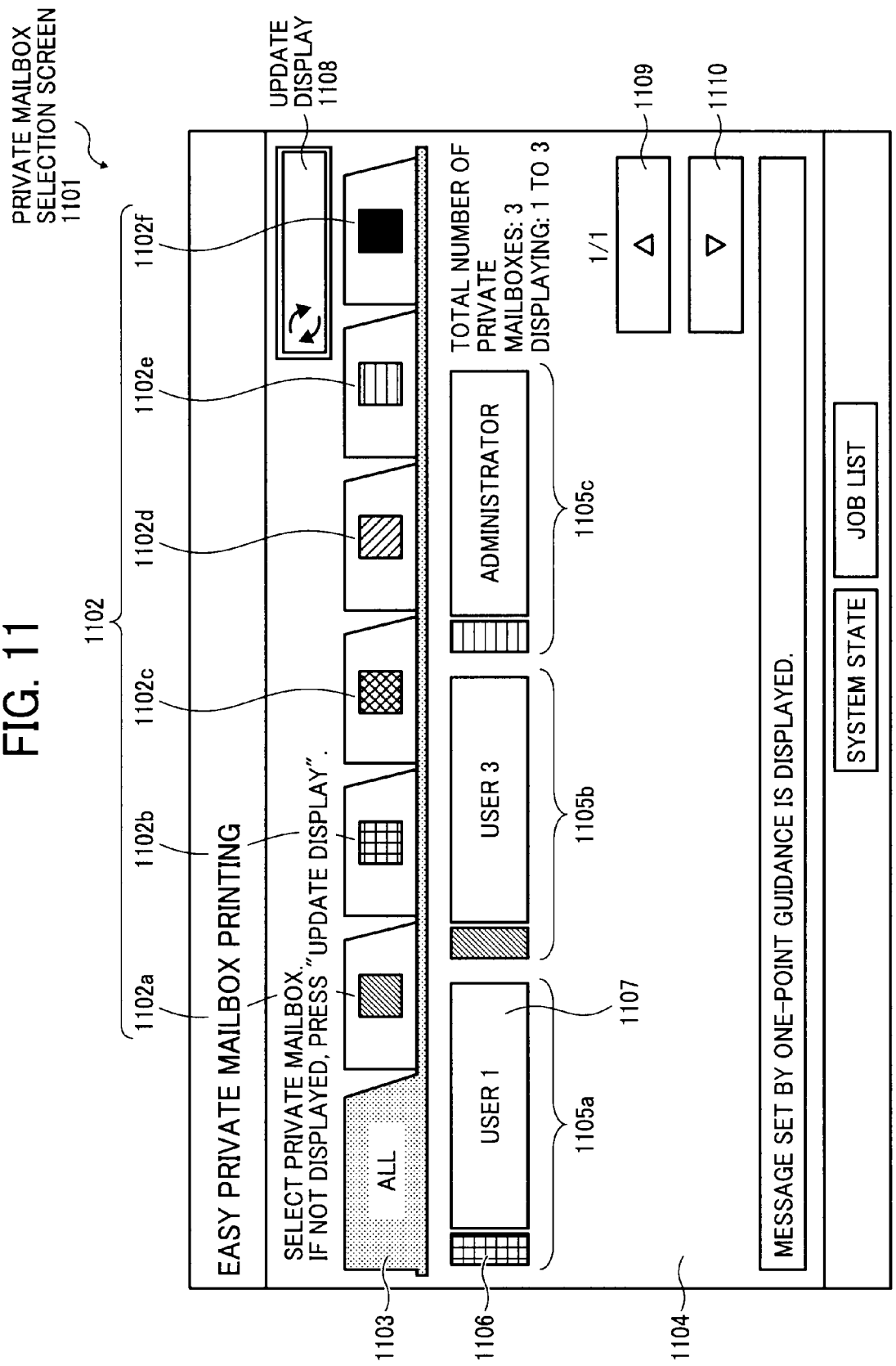
FIGS. 11 to 13 illustrate a private mailbox selection screen displayed on the LCD display unit illustrated in FIG. 2.
Figure 12:
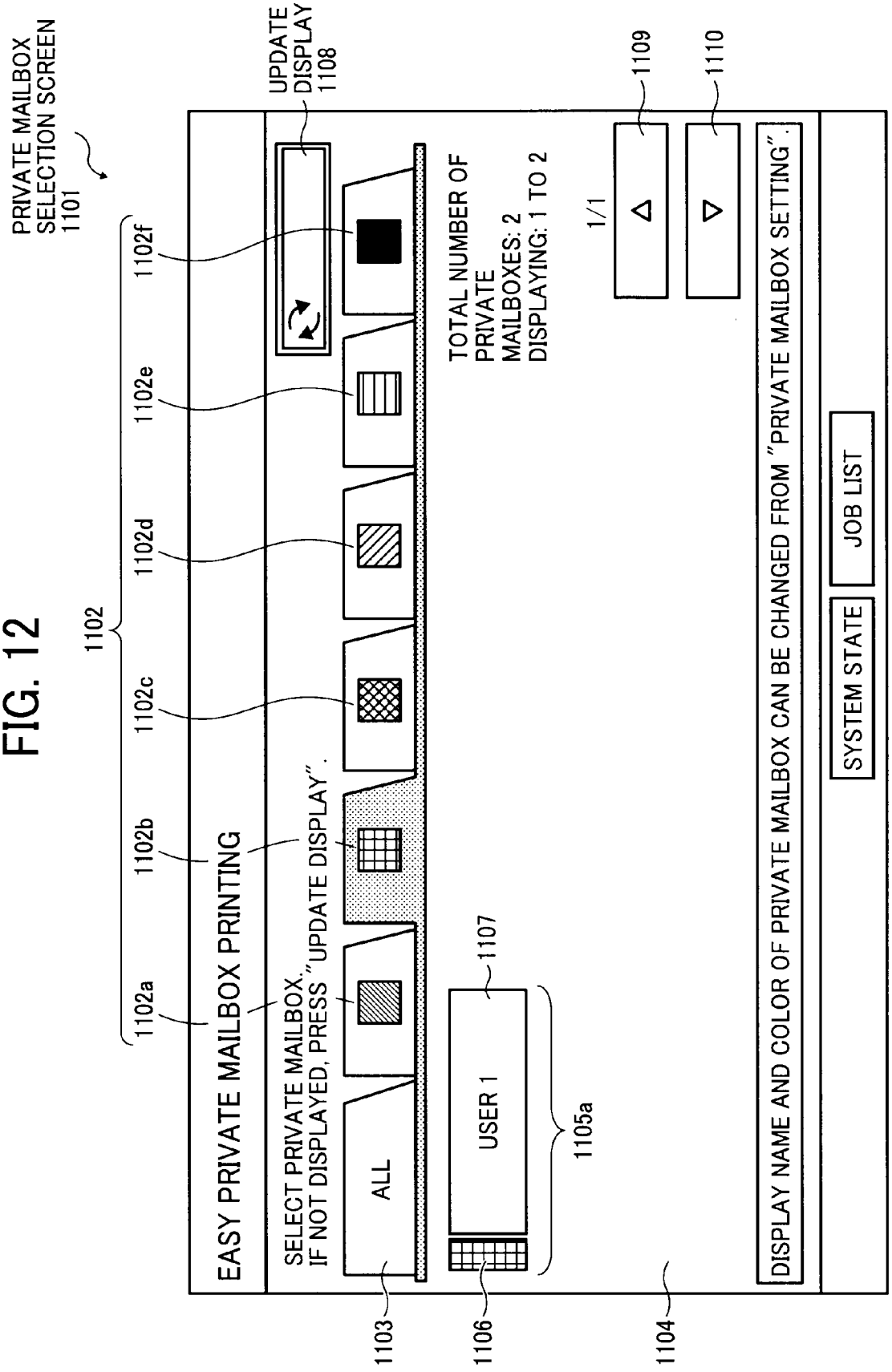
Figure 13:
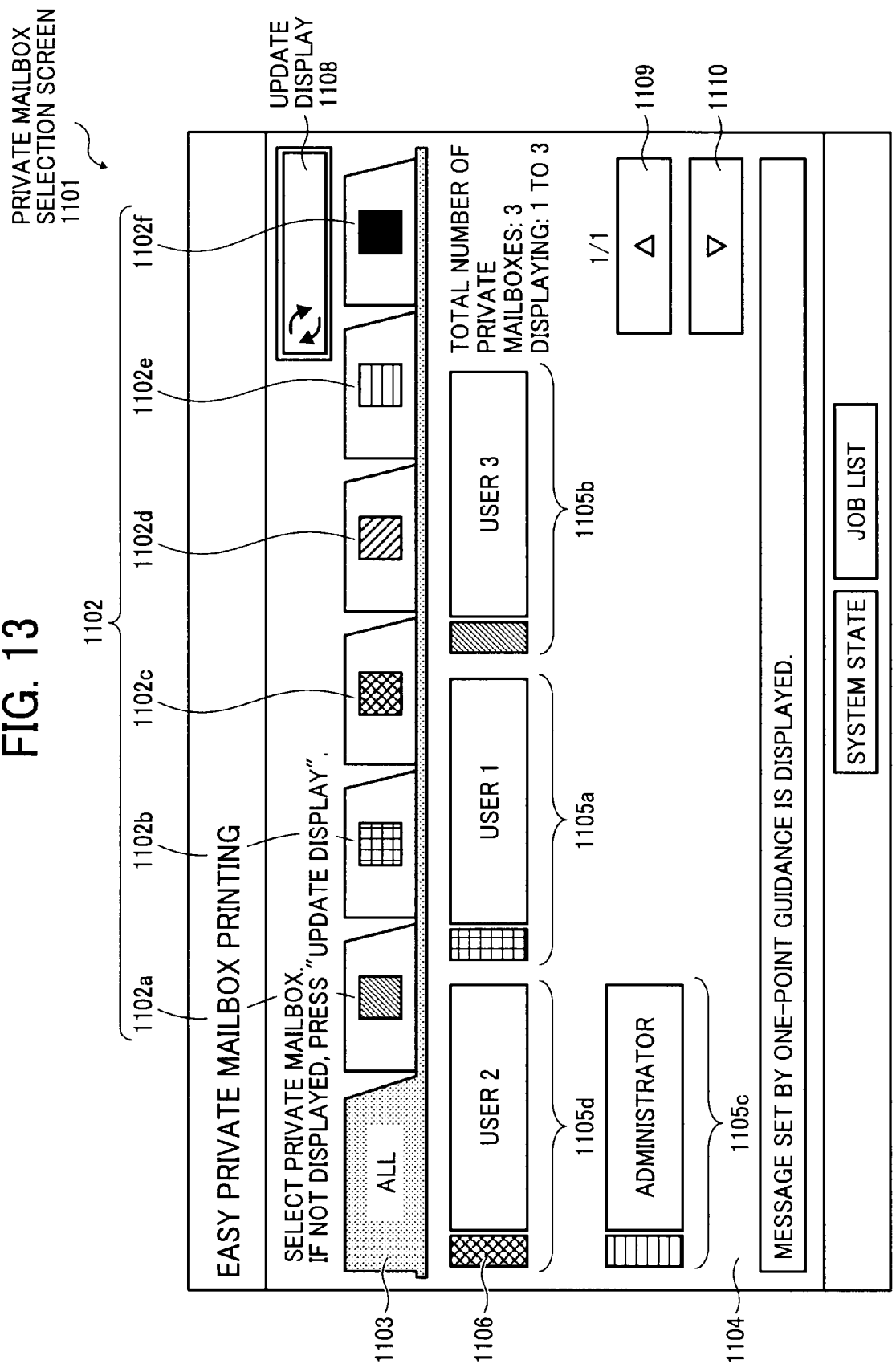

FIGS. 11 to 13 illustrate the private mailbox selection screen displayed on the LCD display unit 207. In a private mailbox selection screen 1101, which is displayed as the display contents on the touch-sensitive panel, color tabs 1102 for selecting users by color and an "all" tab 1103 for selecting all users are displayed. With reference to FIG. 11, the color tabs 1102 include a deep blue color tab 1102a, a blue color tab 1102b, a green color tab 1102c, a pink color tab 1102d, a red color tab 1102e, and a black color tab 1102f in this order starting from the left side.

Below the color tabs 1102 and the "all" tab 1103 is provided a user display area 1104 for displaying a maximum of nine users. In the user display area 1104 are also displayed private mailbox buttons 1105. Each private mailbox button 1105 is made of a combination of a color mark 1106 and a user name display section 1107.

In the example illustrated in FIG. 11, the private mailbox buttons 1105 are displayed corresponding to three users as the users having the corresponding set of print data in the spooling area 303. The user display area 1104 can display the private mailbox buttons 1105 for a maximum of nine users. If the total number of users having the corresponding set of print data in the spooling area 303 is equal to or larger than 10, the private mailbox buttons 1105 for the 10-th and subsequent users need to be displayed on a separate screen. For that, at the lower right portion of the private mailbox selection screen 1101; a "previous page" button 1109 and a "next page" button 1110 are displayed.

If the total number of users each having a set of print data in the spooling area 303 is equal to or smaller than nine, the "previous page" button 1109 and the "next page" button 1110 are paled out indicating a disabled state of the button operation.

On the other hand, if the total number of users each having a set of print data in the spooling area 303 is between 10 and 18, the private mailbox buttons 1105 in the user display area 1104 are displayed on two screens. When the first nine users are displayed in the user display area 1104, the "previous page" button 1109 is paled out indicating a disabled state of the button operation. When the 10-th user onward are displayed in the user display area 1104, the "previous page" button 1109 is darkened indicating an operable state of the button operation and the "next page" button 1110 is paled out indicating a disabled state of the button operation.

The "previous page" button 1109 and the "next page" button 1110 correspond to "page number" specified at Step S901 in FIG. 9.

In the state illustrated in FIG. 11, the "all" tab 1103 is pressed and the private mailbox buttons 1105 of all users having the sets of print data, respectively, are displayed as a list in the user display area 1104. Herein, user named "user 1" is displayed with blue color of the color mark 1106, "user 3" is displayed with black color of the color mark 1106, and "administrator" is displayed with red color of the color mark 1106.

When the blue color tab 1102b is pressed in the state illustrated in FIG. 11, the tab 1102b comes to the front as illustrated in FIG. 12. At the same time, the user display area 1104 displays only the private mailbox button 1105 for "user 1" that corresponds to blue color. This represents the result when "blue" is specified as a parameter in the private-mailbox-selection-screen displaying operation described with reference to FIG. 9.

Consider a case when a user named "user 2" sends print data in the state illustrated in FIG. 11. However, when looking at the touch-sensitive panel of the multifunction product 105, the user cannot see "user 2" in the list of the private mailbox buttons 1105 displayed in the user display area 1104. Hence, the user presses the update button 1108 so that, as illustrated in FIG. 13, a private mailbox button 1105d appears with the green color tab 1102c accompanied thereto. This represents the result when nothing is specified as a parameter in the private-mailbox-selection-screen displaying operation described with reference to FIG. 9. That is, as a result of pressing the update button 1108, the private-mailbox-selection-screen displaying operation is performed and the set of print data, which corresponds to "user 2" and has not been displayed until just before the pressing of the update button 1108, gets newly displayed.

In the case when only a single user possesses a set of print data, in the user display area 1104 in the private mailbox selection screen 1101 illustrated in FIG. 11, the private mailbox button 1105 of only the single user is displayed, even if a large number of users are registered in the multifunction product 105. Hence, the user can select and press the single private mailbox button 1105 without selecting and pressing the color tab 1102.

Herein, the color tabs 1102 are provided so that it becomes easy to narrow down the users when a large number of users possess a set of print data and when not all users can be displayed in the user display area 1104 by pressing the "all" tab 1103.

Figure 14:
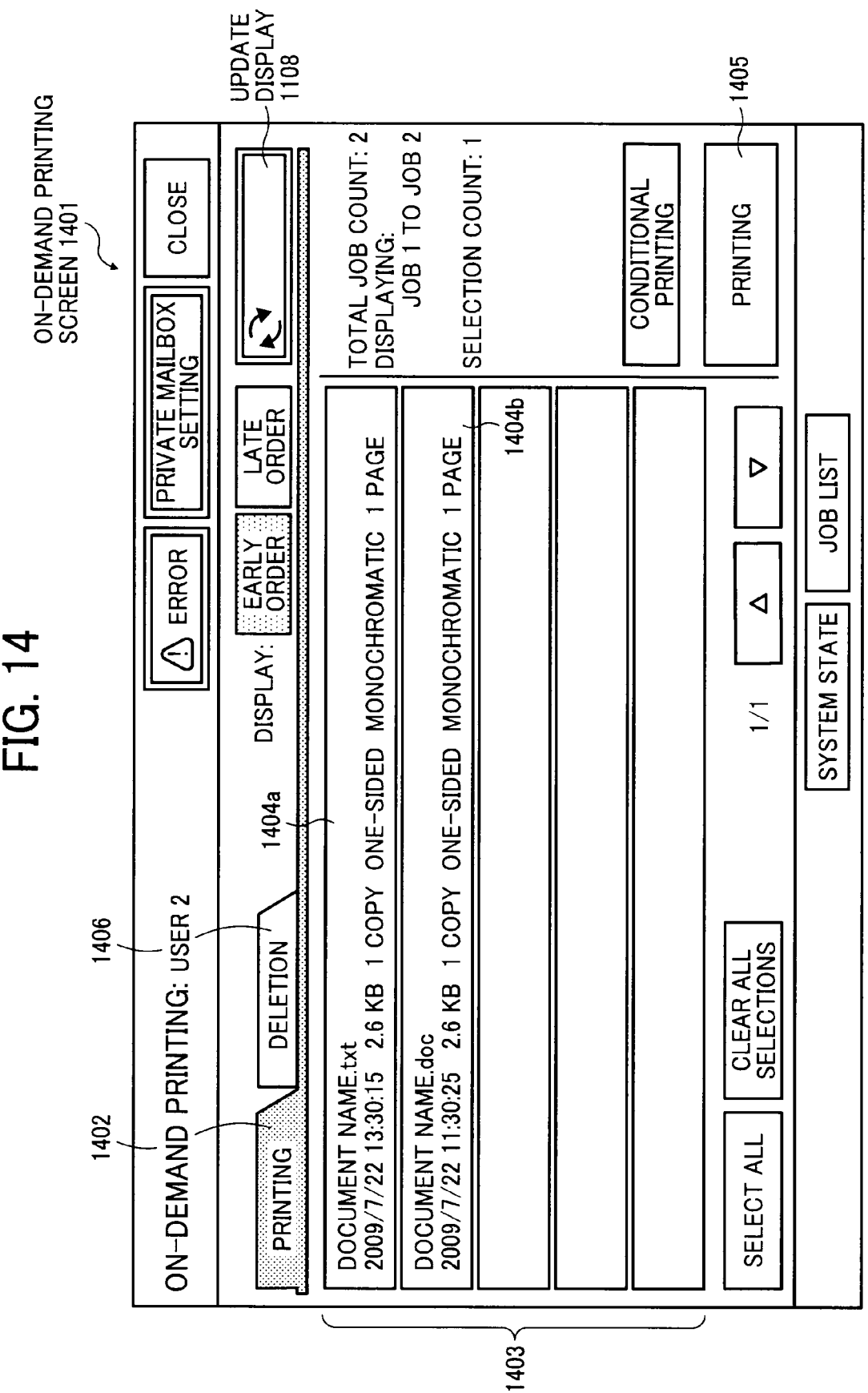
FIG. 14 illustrates an on-demand printing screen displayed on the LCD display unit illustrated in FIG. 2.

FIG. 14 illustrates an on-demand printing screen displayed on the LCD display unit 207. Herein, when the user named "user 2" presses the private mailbox button 1105d in the state illustrated in FIG. 13, the display contents change in the manner illustrated in FIG. 14. Incidentally, when it is necessary to input a password, then a screen therefor is displayed. However, the details of the operation thereof are omitted from this description.

In the initial state of an on-demand printing screen 1401, a "printing" tab 1402 comes to the front of the screen. In that state, a print data display area 1403 displays a print data section 1404 with the information regarding document names and date/time. By pressing the print data section 1404 from the touch-sensitive panel, the corresponding set of print data gets specified and the display color changes to a highlighted color. Subsequently, when a "printing" button 1405 at the lower right portion of the screen is pressed, the specified set of print data gets printed. On the other hand, if a "deletion" button 1406 is pressed, then the specified set of print data gets deleted.

Given below are the exemplary applications of the present embodiment.

(1) Although the present embodiment is described with reference to the multifunction product, it is also possible to use a single-function printer not equipped with the copying function, the facsimileing function, or the scanning function.

(2) The multifunction product can be equipped with a web server function so that the multifunction product can be accessed from a terminal through a web browser and a user interface equivalent to the private mailbox setting screen can be provided on the terminal.

(3) The field separators in the print data file names illustrated in FIG. 6 are not confined to commas. For example, when the characters usable in the file names are converted using alphanumeric characters or some limited symbol characters in the URL encoding system specified in RFC3986 (http://tools.ietf.org.html/rfc3986) or in the Base64 encoding system specified in RFC3548 (http://tools.ietf.org.html/rfc3548), then the characters not used in such encoding systems or the strings that are not likely to appear can be used as the field separators.

In the present embodiment, the printing function of a multifunction product is taken as an example. Herein, from the "authenticated user name" or the "user name" and the "computer name" included in the header of a set of print data, the multifunction product extracts information that enables unique identification of the user. Subsequently, the multifunction product confirms whether the extracted information already exists in the internally-maintained user information table. If it is determined that the extracted information indicates a new user, the multifunction product immediately registers the extracted information and creates a spool directory unique to the new user. This eliminates the need for performing the task of manual user registration as is necessary in the conventional technology. As a result, it becomes possible to implement on-demand printing without performing the task of user management.

Moreover, in the multifunction product according to the present embodiment, with the purpose of narrowing down the users from the users registered in the user information table, the users possessing a print data files, respectively, are displayed on the touch-sensitive panel. Hence, from the list of the users possessing print data files, each user can select only the button corresponding thereto. This makes it possible to easily narrow down the users having a set of print data.

Furthermore, in order to simplifying the narrowing down of users, the "private mailbox color" field is provided in the user information table. Thus, the users can select one of the colors in an arbitrary manner and register the selected color so that the users become identifiable by colors. Consequently, by selecting one of the color tabs displayed on the touch-sensitive panel, it is possible to easily narrow down the user having a set of print data.

Meanwhile, the printing device according to the present embodiment has a hardware configuration of a commonplace computer and has a control device such as a CPU, a memory device such as a ROM or a random access memory (RAM), an external memory device such as a hard disk drive (HDD) or a compact disk (CD) drive device, a display device, and an input device such as a keyboard or a mouse. A computer program executed in the printing device according to the present embodiment is provided in the form of an installable file or an executable file on a computer-readable storage device such as a compact disk read only memory (CD-ROM), a flexible disk (FD), a compact disk recordable (CD-R), or a digital versatile disk (DVD).

Alternatively, the computer program executed in the printing device according to the present embodiment can be saved on a computer connected to a network such as the Internet and can be downloaded therefrom via the network. Still alternatively, the computer program executed in the printing device according to the present embodiment can be made available for distribution through a network such as the Internet. Still alternatively, the computer program can be stored in advance in a read only memory (ROM) or the like for distribution.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Thus, according to an aspect of the present invention, it is possible to achieve on-demand printing in which the task of manual user registration need not be performed and in which the task of user management also becomes redundant because user registration gets done as a result of executing the printing operations. This enables achieving enhancement in the user-friendliness.

What is claimed is:

1. A printing device comprising:
a print data management unit that stores and manages print data associated with identification information that corresponds to a user;
an information management unit that stores and manages the identification information according to group identification information, the group identification information allocating the stored identification information into groups;
a receiving unit that receives the print data;
a registration determining unit that determines whether the identification information associated with the print data received by the receiving unit already exists in the information management unit;
an identification information registering unit that adds the identification information in the information management unit to the print data management unit when the identification information associated with the print data received by the receiving unit does not exist;
a print data storing unit that stores the print data received by the receiving unit in the print data management unit associated with the identification information; and
a display unit that:
displays, based on the group identification information, a first selection button that when activated by the user, selects a group that corresponds to particular identification information;
displays a second selection button that, when activated by the user, selects the particular identification information; and
displays a selection screen that includes the print data stored in the print data management unit that corresponds to the particular identification information.

2. The printing device according to claim 1, wherein the print data management unit includes, corresponding to each individual piece identification information, a storing area for storing print data, the print management unit storing the print data in the storing area that corresponds to the identification information included in the print data, and the print management unit manages the print data, and the printing device further comprising:
a storing area creating unit that creates a storing area in the print data management unit for storing the print data corresponding to the identification information when the registration determining unit determines that the identification information associated with the print data received by the receiving unit does not exist in the print data management unit.

3. The printing device according to claim 1, wherein the identification information obtaining unit includes
a first obtaining unit that obtains, as the identification information, user authentication information included in the print data;
a confirming unit that confirms, when the first obtaining unit is unable to obtain the user authentication information, a specified format of the identification information that is specified in advance; and
a second obtaining unit that obtains the identification information included in the print data based on the specified format confirmed by the confirming unit.

4. The printing device according to claim 3, wherein
the user authentication information obtained by the first obtaining unit represents user authentication information, which is set when the print data is sent from a transmission source device to the printing device, and
the specified format either represents user information on a user who has logged in the transmission source device or represents device identification information that identifies the transmission source device.

5. The printing device according to claim 1, further comprising:
a file name generating unit that generates a file name for the print data received by the receiving unit;
a print-data-attribute-information reading unit that reads print data attribute information included in the print data; and
a rewriting unit that rewrites the file name of the print data based on the print data attribute information read by the print-data-attribute-information reading unit, wherein
the print data storing unit stores the print data in a file with the file name rewritten by the rewriting unit.

6. The printing device according to claim 1, further comprising:
an updating unit that updates the screen displayed by the display unit in response to an update request.

7. The printing device according to claim 1, wherein
the display unit displays only the selection screen corresponding to the particular identification information that is associated with the print data managed by the print data management unit.

8. The printing device according to claim 1, wherein
the display unit displays only a selection screen corresponding to the particular identification information that is associated with the selected group.

9. The printing device according to claim 8, wherein the display unit displays a selection screen that allows selection between
displaying, based on the particular identification information, a selection screen corresponding to the particular identification information and
displaying only a selection screen corresponding to the particular identification information that is associated with the group identification information.

10. A printing method implemented in a printing device, the printing method comprising:
storing and managing, by a print data management unit, print data associated with identification information that corresponds to a user;
storing and managing, by an information management unit, the identification information according to group identification information that allocates the stored identification information into groups;
receiving, by a receiving unit, the print data;
determining, by a registration determining unit, whether the identification information associated with the print data received by the receiving unit already exists in the information management unit;
adding, by an identification information registering unit, the identification information in the information management unit to the print data management unit when it is determined that the identification information associated with the print data received by the receiving unit does not exist;
storing, by a print data storing unit, in the print data management unit the print data received at the receiving associated with the identification information;
displaying, based on the group identification information, a first selection button that when activated by the user, selects a group that corresponds to particular identification information;
displaying a second selection button that, when activated by the user, selects the particular identification information; and
displaying a selection screen that includes the print data stored in the print data management unit that corresponds to the particular identification information.

11. The printing method according to claim 10, further comprising:
updating, by an updating unit, a screen displayed in response to an update request.

12. A non-transitory computer-readable recording medium containing instructions that, when executed by a computer cause the computer to perform a process, the process comprising:
storing and managing print data in a print data management unit the print data associated with identification information that corresponds to a user;
storing and managing the identification information, in an information management unit, according to group identification information that allocates the stored identification information into groups;
receiving the print data;
determining whether the identification information associated with the print data received at the receiving already exists in the information management unit;
adding the identification information in the information management unit to the print data management unit when it is determined that the identification information associated with the print data received at the receiving does not exist;
storing in the print data management unit the print data received at the receiving associated with the identification information
displaying, based on the group identification information, a first selection button that when activated by the user, selects a group that corresponds to particular identification information;
displaying a second selection button that, when activated by the user, selects the particular identification information; and displaying a selection screen that includes the print data stored in the print data management unit that corresponds to the particular identification information.

13. The printing device according to claim 1, wherein the information management unit comprises:
    an identification information storing unit that stores the identification information; and
    an identification information obtaining unit that obtains the identification information associated with and included in the print data, wherein
the print data management unit manages print data associated with identification information which is stored in the identification information storing unit,
the registration determining unit determines whether the identification information obtained by the identification information obtaining unit is already registered in the identification information stored in the identification information storing unit, and
the identification information registering unit registers the identification information obtained by the identification information obtaining unit in the identification information storing unit, when the registering determining unit determines that the obtained identification information is unregistered.

14. The printing device according to claim 1, wherein the identification information is user identification information.

15. The printing device according to claim 1, wherein
the identification information is user identification and terminal identification information, and
the receiving unit receives the print data from a terminal.

16. The printing method according to claim 10, wherein the identification information is user identification information.

17. The printing method according to claim 10, wherein
the identification information is user identification and terminal identification information, and
the receiving unit receives the print data from a terminal.

18. The non-transitory computer-readable recording medium according to claim 12, wherein the identification information is user identification information.

19. The non-transitory computer-readable recording medium according to claim 12, wherein
the identification information is user identification and terminal identification information, and
the receiving unit receives the print data from a terminal.

20. The printing device according to claim 1, wherein
the group identification information is color information,
the information management unit stores and manages the identification information according to the color information, the color information allocating the stored identification information into groups that each have a different color, and
the particular identification information is particular color information.

* * * * *